April 25, 1944. N. T. NARANICK 2,347,212
HOLDER FOR SELF-HEATING RATION CONTAINERS
Filed May 27, 1943
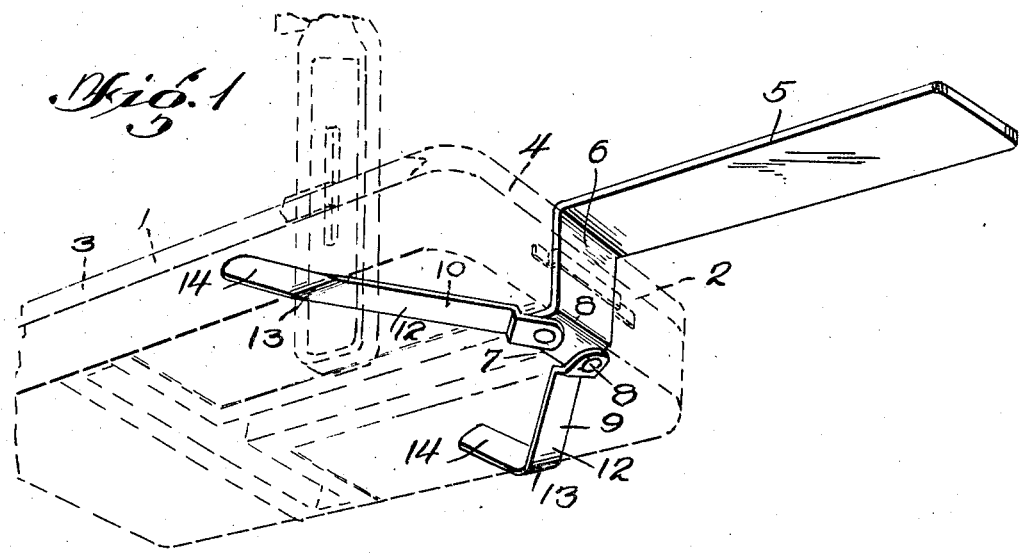
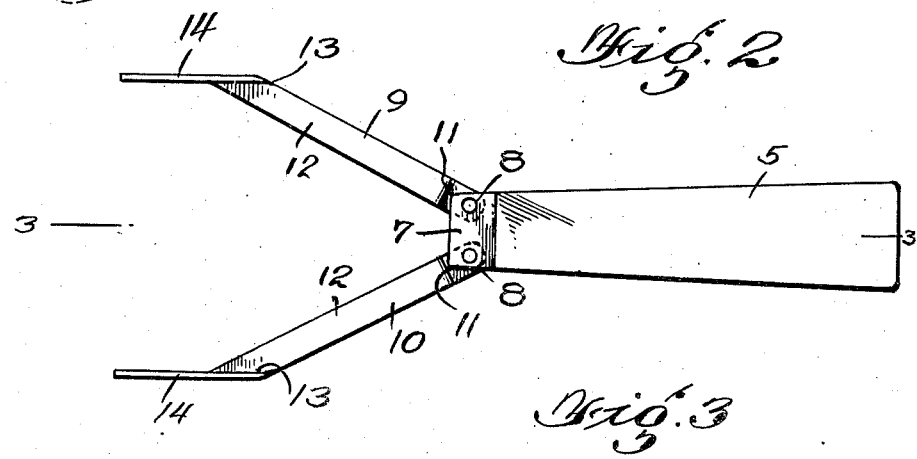
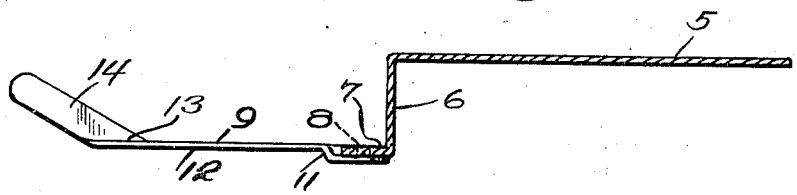
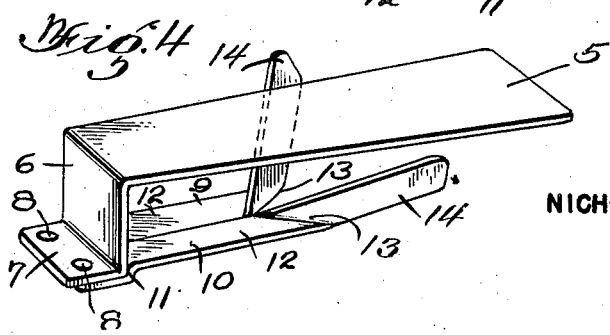
INVENTOR.
NICHOLAS THOMAS NARANICK
BY
W. F. Doyle.
ATTORNEY Patented Apr. 25, 1944

2,347,212

UNITED STATES PATENT OFFICE 2,347,212

HOLDER FOR SELF-HEATING RATION CONTAINERS

Nicholas Thomas Naranick, United States Army, Casper, Wyo.

Application May 27, 1943, Serial No. 488,710

6 Claims. (Cl. 294—28)

(Granted under the act of March 3, 1883, as amended April 30, 1928; 370 O. G. 757)

The invention described herein, if patented, may be manufactured and used by or for the Government for governmental purposes, without the payment to me of any royalty thereon.

This invention relates to a holder for containers and more specifically to a holder for a self-heating ration container provided with means applied to the lower outer surfaces of the container in the form of a plastic of about the consistency of putty, that later sets, which provides a heating medium, that when ignited, will burn in a smouldering manner, without flame or smoke.

The device here disclosed is for the purpose of holding the container while it is being heated by the above or other means, while the lid of the container is being removed or the rip strip that seals the lid on the container is being removed to expose the heated food therein, and while the food is being consumed.

The objects in view are to provide a simple, durable and inexpensive device that may be economically cut from sheet metal, shaped, punched and its parts conveniently assembled, that will firmly support the container when tilted at any angle; may be folded into compact form, to occupy very little space, can be promptly adjusted to the container and may be repeatedly used due to its sturdy construction, without failure, as a result of the rough usage to which the holder will be subjected in the Army, on camping parties and the like.

While a preferred form of the holder is here shown, it will be understood that slight changes in form and minor details of construction may be resorted to without departing from the spirit of the invention or fall beyond the scope of the claims.

Similar numerals indicate corresponding parts in all the figures of the drawing in which Fig. 1 is an underneath perspective view of my improved holder for containers, showing a container in place in the holder and a means of removing the cover of the container in dots.

Fig. 2 is a plan view of the holder with its parts in container holding position.

Fig. 3 is a section on line 3—3 of Fig. 2.

Fig. 4 is a perspective view of the holder when folded.

Reference now being had to the drawing, 1 indicates in dots, a shallow, elongated, rectangular container having a wide flat loop 2 mounted at its end, and a cover 3 sealed by a rip strip 4, the latter as shown, adapted to be torn from place and release the cover.

The holder is of such a form as to permit of its parts being cut from sheet metal, shaped and punched and volume production accomplished at little cost and due to its simplicity will not require the services of skilled labor in its production.

The holder which is entirely of sheet metal consists of the handle member having the handhold portion 5 whereby the holder is supported, said handle consisting of the portion adapted to be grasped by the hand, said portion being bent at 6 downwardly at right angles for a distance of slightly more than the depth of the container with which the holder is intended for use. The lower end of said portion 6, said handle member is again bent a short distance forwardly at 7, approximately horizontally or in a plane corresponding with that of the handhold portion 5 of the handle.

Pivotally mounted, preferably by rivets at 8—8 are right and left supporting arms 9 and 10, which are also of sheet metal, are mounted at their rear ends to the under face of the portion 7 of the handle member at their respective sides of said portion. The arms 9 and 10 are provided a short distance beyond the pivots 8—8 with vertical bends as shown at 11—11 thus bringing the remaining horizontal portions 12—12 of the arms up into contact with the container to firmly support same. The arms 9 and 10 are bent at 13—13 along horizontal lines in such a manner as to cause the outer ends 14—14 of said arms to lie flat at an angle of about 45 degrees against and are adjusted to hug the sides of the container, and firmly hold it at practically any angle, for instance, as is required to pour liquid out of the container.

From the drawings and specification of this application, the operation of the holder will be evident, it being observed that the loop 2 is of such a depth and width particularly so as to its depth and the width and thickness of the handle portion 6 of the holder so nearly correspond that there is provided a comparatively snug fit between the parts, it being further observed that the forwardly bent portion 7 of the handle member extends beneath the lower edge of the container a greater distance than any horizontal play of the vertical portion 6 of the handle is permitted in the loop.

By the above construction and arrangement of the parts it will be obvious that the container cannot leave the holder in a longitudinal direction due to the capacity of the loop and the thickness of the vertical portion of the handle and, by the construction of said parts, namely, a comparatively snug fit as to thickness and width of portion 6 of the handle and capacity of the loop, any lateral swing of the container as in tilting same to pour out its contents or by accident will be very limited by the above referred to relatively snug fit of the handle in the loop.

It is also due to the snug fit above referred to and the projection of the portion 7 of the handle beneath the container that will, practically maintain the container in a horizontal position in the holder without the aid of the supporting arms 9 and 10, the latter being auxiliary to the above, and providing greater security as a holder.

The holder will fold into practically ½ of its length.

The parts, three in number, can all be cut, punched and shaped in single operations and the rivets that act as pivots can be applied by mechanical means and by unskilled labor at very low cost.

To adjust the container on the holder, the arms 9 and 10 are extended, the rear end of the handle portion 5 is inserted from beneath through the loop on the container and the container is adjusted forwardly and downwardly until it rests in place on the arms between the up-turned portions 14—14 of said arms.

The holder here disclosed and as above described, is for the purpose of supporting a self-heating ration can and is practically always used in the trenches in the dark and for that reason there must be some slight freedom between the ends of the loop and the handle to enable the used to associate the parts for threading the handle through the loop.

What I claim and desire to secure by Letters Patent is:

1. The combination with a container having a loop at its end, of a holder comprising, a handle portion having a horizontally arranged handhold portion, a downwardly extending vertical portion, adapted to extend through said loop and a forwardly extending portion at the lower end of said vertical portion, adapted to extend beneath and support the container, right and left supporting arms having upwardly extending portions at their outer ends pivotally mounted at their inner ends on said forwardly extending portion of the handle, said arms extending from their pivots divergently along the bottom and up their respective sides of the container, adapted to support and laterally retain the container on the holder.

2. The combination with a container having a loop at its end, of a foldable container holder comprising, a handle portion having a downwardly extending vertical portion adapted to extend through the loop of the container, and a forwardly extending horizontal portion adapted to extend beneath the lower edge of the container, arms pivotally mounted on said horizontal portion and extending diagonally in divergent directions, beneath and up at opposite sides of the container, adapted to support and prevent lateral displacement of the container respectively, when the parts of the holder are in their container holding positions, said arms adapted to fold back against opposite sides of said handle portion when the holder is folded.

3. The combination with a rectangular container having a loop at its end, of a foldable holder comprising, a handle portion having a downwardly extending vertical portion adapted to rest within said loop and a forwardly extending horizontal portion adapted to extend beneath the lower edge of the container, arms, pivotally mounted at their rear ends on said horizontal portion and extending diagonally in divergent directions beneath and up at opposite sides of the container, adapted to support and prevent lateral displacement of the container when the parts of the holder are in container holding positions, said arms adapted to fold back against opposite sides of said handle portion when the holder is folded.

4. The combination with a rectangular container having a flat loop at its end, of a foldable holder comprising a sheet metal handle portion having a downwardly extending vertical portion adapted to rest within said loop and prevent longitudinal and transverse movement of the container on the holder and a forwardly extending horizontal portion adapted to extend beneath the lower edge of the container, sheet metal arms pivotally mounted at their rear ends on said horizontal portion and extending diagonally in divergent directions beneath and up at opposite sides of the container, adapted to support and prevent lateral displacement of the container when the parts of the holder are in container holding positions, said arms adapted to fold back against opposite sides of said handle portion when the holder is folded.

5. The combination with a rectangular container having a loop at its end, of a folding holder comprising, a handle portion having a downwardly extending vertical portion adapted to rest within said loop, and a forwardly extending horizontal portion adapted to extend beneath the lower edge of the container, arms pivotally mounted at their rear ends on said horizontal portion and extending diagonally in divergent directions beneath the container adapted to support same and having upwardly extending outer ends adapted to rest on opposite sides of the container to prevent lateral movement of the container on the holder.

6. As an article of manufacture, a folding sheet metal container holder comprising, a handle portion consisting of a horizontally arranged handhold portion, a vertical depending portion, and a horizontally arranged arm supporting portion extending from the lower end of said vertical portion, right and left hand supporting arms having upwardly extending portions at their outer ends, pivotally mounted at their inner ends on said arm supporting portion, said arms adapted to be extended as a container holder, and when folded to swing back against said handhold portion.

NICHOLAS THOMAS NARANICK.